United States Patent [19]

Ting

[11] Patent Number: 5,842,282
[45] Date of Patent: Dec. 1, 1998

[54] LASER ANGLE ADJUSTMENT DEVICE FOR LASER MEASURING INSTRUMENTS

[75] Inventor: Jack C. T. Ting, Yun-Lin Hsien, Taiwan

[73] Assignee: Opcom Inc., Taipei, Taiwan

[21] Appl. No.: 724,309

[22] Filed: Oct. 1, 1996

[51] Int. Cl.⁶ ............................. G01C 9/00; G01C 15/02
[52] U.S. Cl. ......................... 33/227; 33/282; 33/275 R; 33/DIG. 21
[58] Field of Search ............................. 33/227, 281, 282, 33/285, 286, DIG. 21, 290, 275 R, 374, 375, 383

[56] References Cited

U.S. PATENT DOCUMENTS

| | | | |
|---|---|---|---|
| 719,061 | 1/1903 | Traut | 33/383 |
| 1,454,693 | 5/1923 | Schlattau | 33/383 |
| 5,184,406 | 2/1993 | Swierski | 33/227 |
| 5,394,616 | 3/1995 | Claxton | 33/275 R |
| 5,519,942 | 5/1996 | Webb | 33/281 |
| 5,531,031 | 7/1996 | Green | 33/281 |
| 5,561,911 | 10/1996 | Martin | 33/DIG. 1 |

Primary Examiner—Christopher W. Fulton
Attorney, Agent, or Firm—A & J

[57] ABSTRACT

A laser angle adjustment device for laser measuring instruments including a rectangular casing, a fixed bubble level and an adjustable bubble level mounted on the casing at right angles, a barrel turned in a hole in the casing, a top cover fixedly fastened to the barrel at one end to hold a laser module for providing a laser reference line for measurement.

1 Claim, 6 Drawing Sheets

LASER ANGLE ADJUSTMENT DEVICE FOR LASER MEASURING INSTRUMENTS

BACKGROUND OF THE INVENTION

1. Field of the Invention

This invention relates a laser angle adjustment device for laser measuring instruments, and relates more particularly to one which enables a laser measuring instrument to be adjusted for providing a laser beam in X-axis or Y-axis direction through 360° for measurement.

2. Description of the Prior Art

Regular laser measuring instrument for measuring or calibrating horizontal or vertical lines are commonly comprised of a frame, a fixed level vial, a fixed vertical vial, and a laser module fixedly mounted on the frame and controlled to provide a laser beam for measurement. However, as the level and vertical vials and the laser module are fixedly mounted on the frame and so it is only fit for measuring an angle of 0° or 90°, i.e., it cannot be adjusted to provide a laser beam in X-axis or Y-axis direction through 360° as desired.

SUMMARY OF THE INVENTION

This invention relates a laser angle adjustment device for laser measuring instruments.

It is the primary object of the present invention to provide a laser angle adjustment device which enables a laser measuring instrument to be adjusted for providing a laser beam in X-axis or Y-axis direction through 360° for measurement.

It is another object of the present invention to provide a laser angle adjustment device which can be turned within the casing of the measuring instrument and adjusted to change the position of the laser module thereof, so as to provide a laser beam in X-axis or Y-axis direction within 360° for measurement.

It is still another object of the present invention to provide a laser angle adjustment device for laser measuring instruments which is convenient to use.

It is still another object of the present invention to provide a laser angle adjustment device for laser measuring instruments which is simple in construction.

It is a further object of the present invention to provide a laser angle adjustment device for laser measuring instruments which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
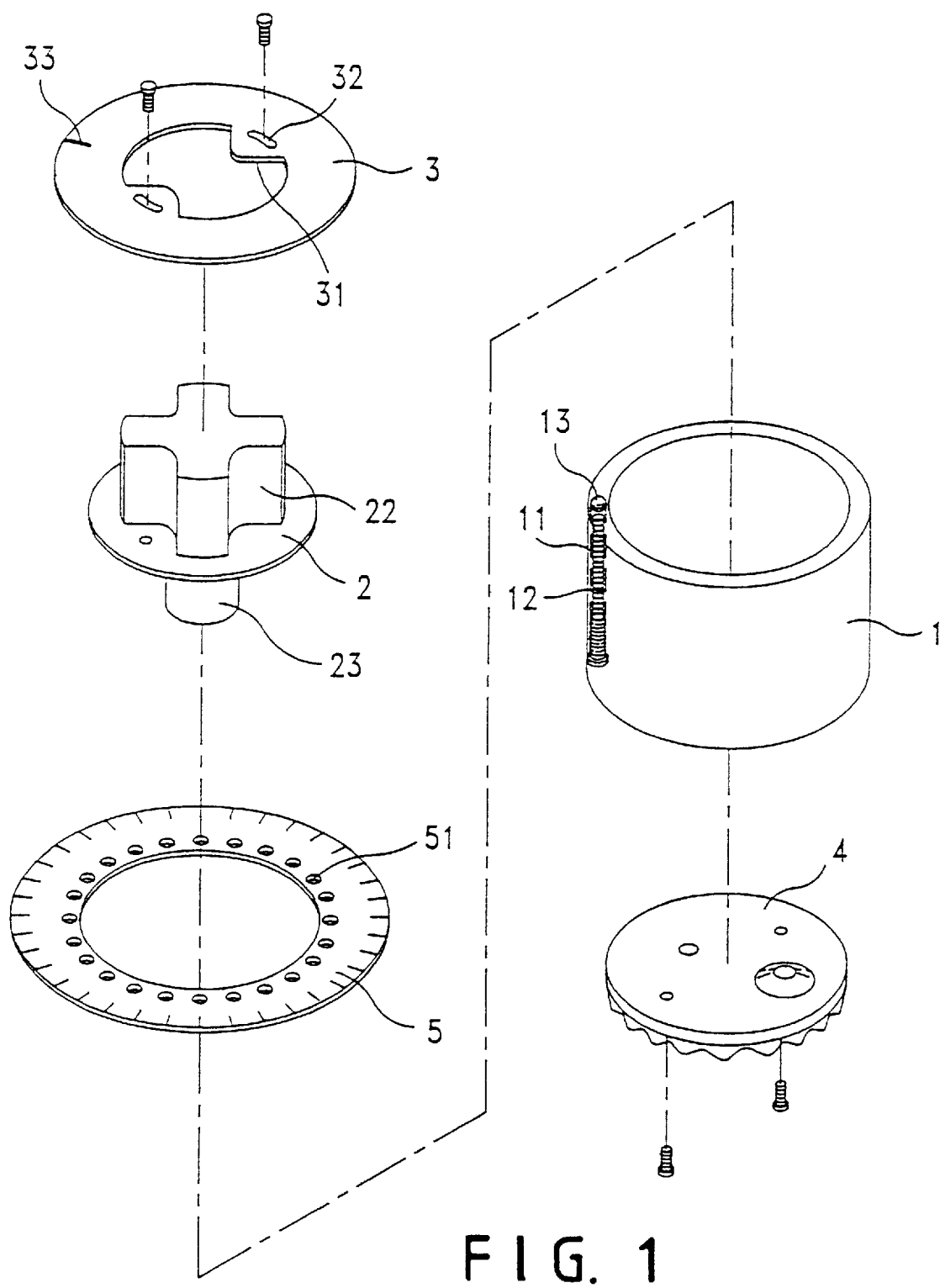
FIG. 1 is an exploded view of a laser angle adjustment device for a laser measuring instrument according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
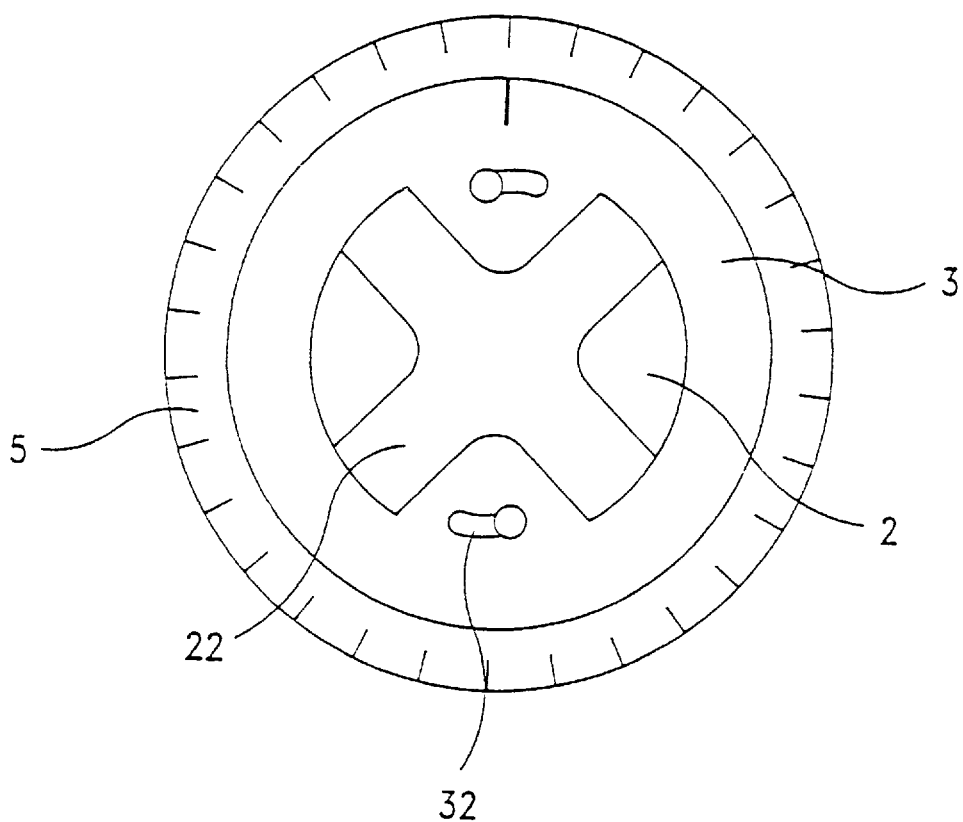
FIG. 2 is a top plain view in an enlarged scale of the laser angle adjustment device shown in FIG. 1.
Figure 3:
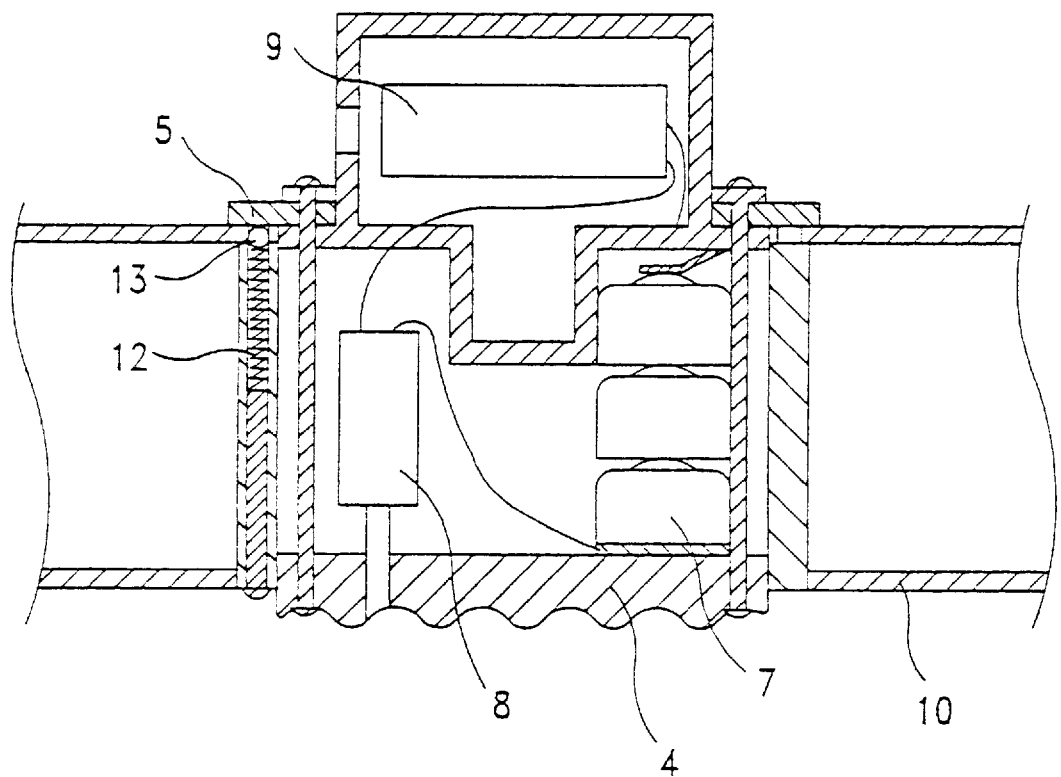
FIG. 3 is a sectional view of the laser angle adjustment device shown in FIG. 1, showing the laser module installed in a horizontal position.

Referring to FIGS. 1, 2, 3, an aluminum barrel 1 is mounted in a transverse through hole (not shown) in a rectangular casing 10, having an axial hole 11 at the periphery, a spring 12 fixedly secured in the axial hole 11, and a steel ball 13 supported on the spring 12 and partially projecting out of one side of the casing 10. An annular graduated scale 5 is fixedly mounted on one side of the aluminum casing 10 in alignment with the barrel 1, having a plurality of locating holes 51 equiangularly spaced around the inner diameter and adapted for receiving the steel ball 13. A top cover 2 is mounted within the barrel 1 at one end below the annular graduated scale 5, having two screw holes 21 at two opposite locations, a horizontal chamber 22 and a vertical chamber 23 disposed at two opposite sides in communication with each other. A bottom cover 4 is mounted within the barrel 1 at an opposite end, and fixedly connected to the screw holes 21 of the top cover 2 by screws. An annular index dial 3 is fastened to the top cover2 on the outside around the horizontal chamber 22, having two inward projections 31 projecting into the inner diameter, two arches calibration holes 32 respectively made through the inward projections 31 and coupled to the top cover 2 by screws. When the screws which secure the index dial 3 to the top cover 2 are loosened, the index dial 3 can be turned relative to the top cover 2 and the annular graduated scale 5 within the limit of the arched holes 32 to calibrate the position (see FIG. 2). When assembled, the top cover 2 can be turned within the barrel 1 relative to the annular graduated scale 5 and the casing 10.

Figure 4:
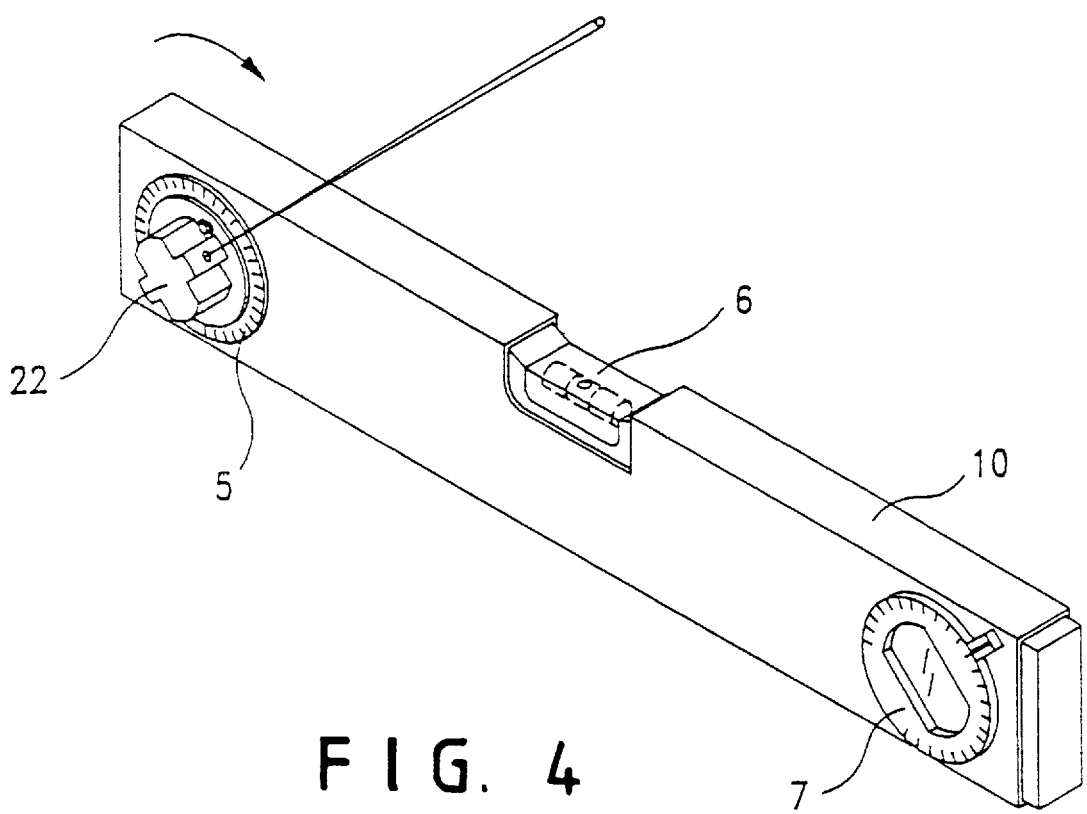
FIG. 4 is an elevational view of a laser measuring instrument arranged in a first arrangement according to the present invention, showing a laser beam produced in X-axis direction.
Figure 5:
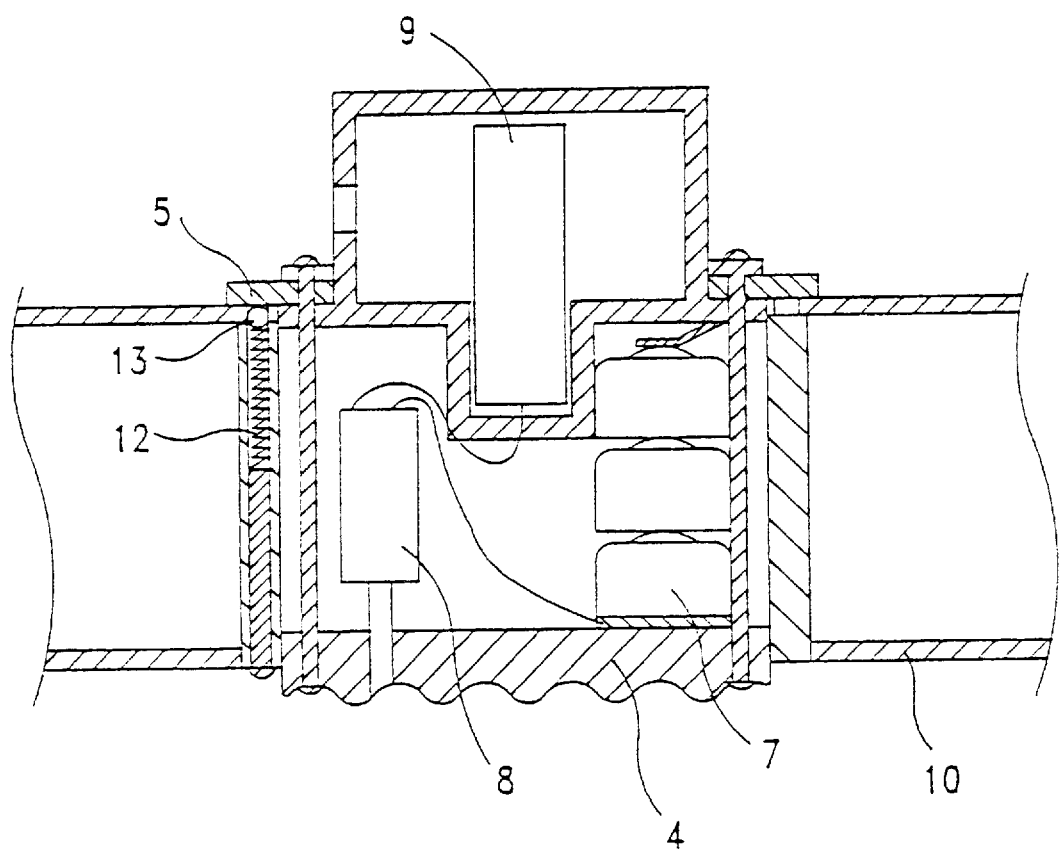
FIG. 5 is a sectional view of the laser angle adjustment device shown in FIG. 1, showing the laser module installed in a vertical position.
Figure 6:
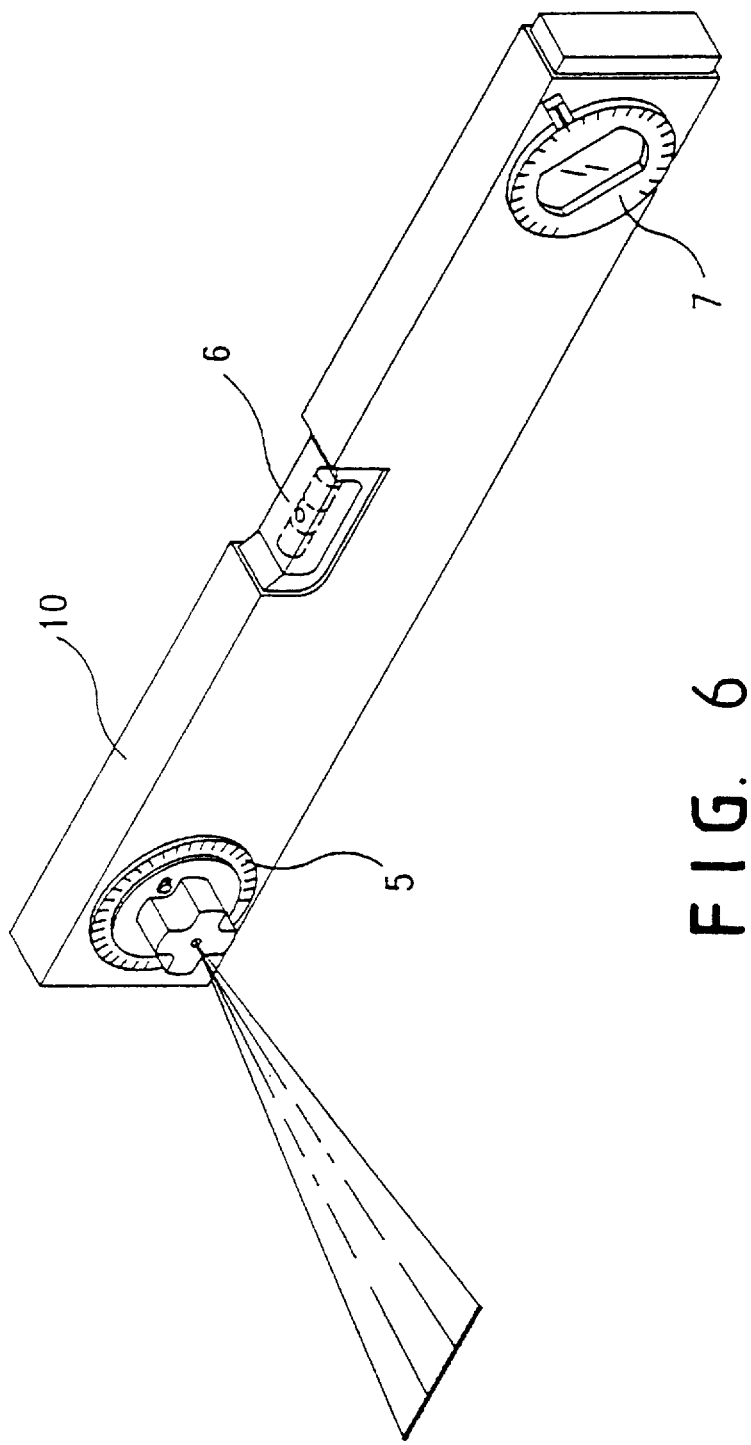
FIG. 6 is an elevational view of a laser measuring instrument arranged in a second arrangement according to the present invention, a showing a laser beam produced in Y-axis direction.

Referring to Figures from 3 to 6, a laser module 9 is installed in the top cover 2, and controlled to emit a laser beam. The laser module 9 can be installed in the horizontal chamber 22 of the top cover 2, and controlled to emit a laser beam in X-axis direction as shown in FIGS. 3 and 4. Alternatively, the laser module 9 can be installed in the vertical chamber 23 of the top cover 2, and controlled to emit a laser beam in Y-axis direction as shown in FIGS. 5 and 6.

Referring to Figures from 4 to 6, a fixed bubble level 6 and an adjustable bubble level 7 are mounted on the casing 10 at right angles. When in use, the laser module 9, when installed in the vertical chamber 23, is controlled to emit a laser beam to a remote object as a reference line for measuring the angle or slope of the remote object. If the laser module 9 is installed in the horizontal chamber 22, it can be used to measure a remote object or to adjust the angle of an object on a non-horizontal plane, by means of the calibration of the fixed bubble level 6 or the adjustable bubble level 7. For example, when the laser measuring instrument is mounted on a sloping plane, which is measured having a 30° slope, and controlled to provide a laser beam at 45° relative to the horizontal line, the top cover 2 is turned to 15° by means of the indication of the annular graduated scale 5.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A laser angle adjustment device for laser measuring instruments comprising:

an elongated aluminum casing having a circular transverse through hole;

a barrel turned within the circular transverse through hole of said aluminum casing, having an axial hole at the periphery, a spring fixedly secured in said axial hole, and a steel ball supported on said spring and partially projecting out of one side of said casing;

an annular graduated scale, fixedly mounted on one side of said aluminum casing in alignment with said barrel, having a plurality of locating holes equiangularly spaced around the inner diameter and adapted for receiving said steel ball;

a top cover mounted with said barrel at one end below and holding a first laser module on the inside, having two screw holes at two opposite locations, a horizontal chamber adapted for holding a second laser module in a horizontal position, and a vertical chamber adapted for holding a laser module in a vertical position; and an annular index dial fastened to said top cover on the outside around, having two inward projections projecting into the inner diameter, two arches calibration holes respectively made through said inward projections and releasably fixed to the screw holes of said top cover by a respective screw;

at least one fixed bubble level mounted on said aluminum casing; and at least one adjustable bubble level mounted on said aluminum casing.

* * * * *